(12) United States Patent
Kousaka et al.

(10) Patent No.: US 6,424,490 B1
(45) Date of Patent: Jul. 23, 2002

(54) MAGNETIC HEAD

(75) Inventors: Masaya Kousaka; Kaoru Aoki, both of Miyagi (JP)

(73) Assignee: Sony Corporation, Tokyo (JP)

( * ) Notice: Subject to any disclaimer, the term of this patent is extended or adjusted under 35 U.S.C. 154(b) by 43 days.

(21) Appl. No.: 09/711,315

(22) Filed: Nov. 13, 2000

(30) Foreign Application Priority Data

Nov. 12, 1999 (JP) .......................................... 11-323435

(51) Int. Cl.⁷ .............................................. G11B 5/147
(52) U.S. Cl. ...................................................... 360/126
(58) Field of Search ................................ 360/126, 125, 360/121, 123

(56) References Cited

U.S. PATENT DOCUMENTS

| | | | | |
|---|---|---|---|---|
| 4,713,297 A | * | 12/1987 | Verbunt | 360/126 |
| 5,001,590 A | * | 3/1991 | Saito et al. | 360/126 |
| 5,113,299 A | * | 5/1992 | Onoe | 360/126 |
| 5,155,645 A | * | 10/1992 | Shimizu et al. | 360/126 |
| 5,170,301 A | * | 12/1992 | Muraoka et al. | 360/126 |
| 5,276,575 A | * | 1/1994 | Kobayashi et al. | 360/126 |
| 5,862,023 A | * | 1/1999 | Inoue et al. | 360/126 |
| 5,901,012 A | * | 5/1999 | Ishida et al. | 360/126 |

FOREIGN PATENT DOCUMENTS

| | | | | |
|---|---|---|---|---|
| JP | 62-205507 | * | 9/1987 | 360/126 |
| JP | 63-2109 | * | 1/1988 | 360/126 |

* cited by examiner

*Primary Examiner*—Allen Cao
(74) *Attorney, Agent, or Firm*—Sonnenschein, Nath & Rosenthal

(57) ABSTRACT

A magnetic head shows a remarkably reduced eddy-current loss. The metal magnetic film 5 of the magnetic core of the magnetic head has a multilayer structure obtained by laying alternately metal magnetic layers 10 and insulating layers 11. The nonmagnetic film 6 of the magnetic head that provides a magnetic gap is also made to have a multilayer structure obtained by arranging first films 20 made of an insulating material, second films 21 made of Cr and a third film 22 made of Au as mentioned from the sides held in contact with the metal magnetic film 5.

2 Claims, 11 Drawing Sheets

MAGNETIC HEAD

RELATED APPLICATION DATA

The present application claims priority to Japanese Application No. P11-323435 filed Nov. 12, 1999, which applications is incorporated herein by reference to the extent permitted by law.

BACKGROUND OF THE INVENTION

1. Field of the Invention

This invention relates to a magnetic head to be suitably used for highly densely recording digital signals on a magnetic recording medium.

2. Related Background Art

Magnetic recording/reproducing apparatus for recording and/or reproducing (hereinafter to be referred to as recording/reproducing) magnetic signals on a tape-shaped magnetic recording medium such as video tape recorders (VTRs) and digital audio tape recorders (DATA recorders) are provided with a magnetic head.

The magnetic head comprises a magnetic core made of a magnetic material and a coil wound around the magnetic core. The magnetic core is provided with a minute magnetic gap.

In the field of magnetic recording in recent years, there is a growing demand for the technology of recording/reproducing ever more magnetic signals at a high speed in order to realize a high image quality of video signals and a high memory capacity and a high transfer rate of recording medium. Efforts have been made to meet the demand by using magnetic signals having a shorter wavelength to be recorded on and/or reproduced from a recording medium by means of a magnetic recording/reproducing apparatus. The recording medium that can meet the demand may be a metal tape obtained by applying powder of a ferromagnetic metal material to a base film or an evaporation type tape obtained by directly depositing a ferromagnetic metal material on a base film by evaporation. Such a magnetic recording medium is highly resistant against magnetic force so that it can stably store and retain high frequency magnetic signals.

As for the magnetic head, there have been proposed magnetic heads wherein a pair of magnetic core halves, each being formed by sandwiching a metal magnetic film between a pair of guard members containing a nonmagnetic material as principal ingredient, are made to abut each other and bonded together at the corresponding end facets of the metal magnetic films and a nonmagnetic film is formed along the interface of the metal magnetic films that are abutting each other in order to produce a magnetic gap.

Such magnetic heads are referred to as multilayer type heads because each of the metal magnetic films of magnetic core has a multilayer structure formed by arranging metal magnetic layers showing a high permeability and a high saturation magnetic flux density with an insulation layer interposed therebetween. Thus, each of the metal magnetic films of a multilayer type head has a multilayer structure formed by arranging metal magnetic layers with an insulation layer interposed therebetween and the metal magnetic films are mutually magneto-statically bonded at corresponding ends thereof. With this arrangement, the eddy-current loss of the head can be reduced and the head efficiency can be improved particularly in a high frequency zone.

Meanwhile, conventional multilayer type heads typically employs gold (Au) as for the material of the nonmagnetic film for forming the magnetic gap. Then, such a nonmagnetic film is formed on the abutting surface of each of the magnetic core halves so that the pair of magnetic core halves may be bonded together by bonding the nonmagnetic films by means of low temperature thermal diffusion bonding. Additionally, a Cr layer may be formed closer to each magnetic core half than the Au layer in conventional multilayer type heads for the purpose of retaining the good adhesion of the Au layer that operates effectively for the low temperature thermal diffusion bonding relative to the corresponding metal magnetic film. Thus, the nonmagnetic film may also have a multilayer structure of a Cr layer and an Au layer.

However, with such an arrangement, the Cr layer of the nonmagnetic film can adhere not only to the guard member of the magnetic core half but also to the metal magnetic film of the magnetic core half. Then, the metal magnetic layer of the multilayer structure of the metal magnetic film becomes short-circuited by the Cr layer to give rise to an increased eddy-current loss. In other words, in a conventional multilayer type head, the effect of the multilayer structure of the metal magnetic film designed for the purpose of reducing the eddy-current loss is offset, if partly, by the Cr layer of the nonmagnetic film for forming the magnetic gap to consequently degrade the performance of the head in a high frequency zone.

BRIEF SUMMARY OF THE INVENTION

Therefore, it is the object of the present invention to provide a magnetic head adapted to prevent any of the metal magnetic layers of its metal magnetic films for forming of the magnetic core from being short-circuited by the nonmagnetic films of the magnetic gap, thereby reducing the eddy-current loss and improving the head efficiency particularly in a high frequency zone. According to the invention, the above object is achieved by providing a magnetic head comprising a pair of magnetic core halves, each being formed by sandwiching a metal magnetic film between a pair of guard members containing a nonmagnetic material as principal ingredient, made to abut each other and bonded together at the corresponding end facets of the metal magnetic films and a nonmagnetic film formed along the interface of the metal magnetic films abutting each other in order to produce a magnetic gap;

each of said metal magnetic films having a multilayer structure formed by arranging metal magnetic layers with an insulation layer interposed therebetween;

said nonmagnetic film having a multilayer structure including a first film of an insulating material, a second film of Cr and a third film of Au as arranged from each of said pair of magnetic core halves, said third films being diffusion bonded to each other.

In a magnetic head according to the invention and having the above described configuration, the electric insulation of the metal magnetic layers of the metal magnetic film can be maintained because the first films of the nonmagnetic film that are held in contact with the respective magnetic core halves are made of an insulating material.

Therefore, the eddy-current loss can be effectively reduced to improve the head efficiency particularly in a high frequency zone. Therefore, a magnetic head according to the invention can stably and reliably record magnetic signals on and reproduce magnetic signals from a magnetic recording medium if the magnetic signals to be recorded on and/or reproduced from the magnetic recording medium have a short wavelength.

DETAILED DESCRIPTION OF THE INVENTION

Figure 1:
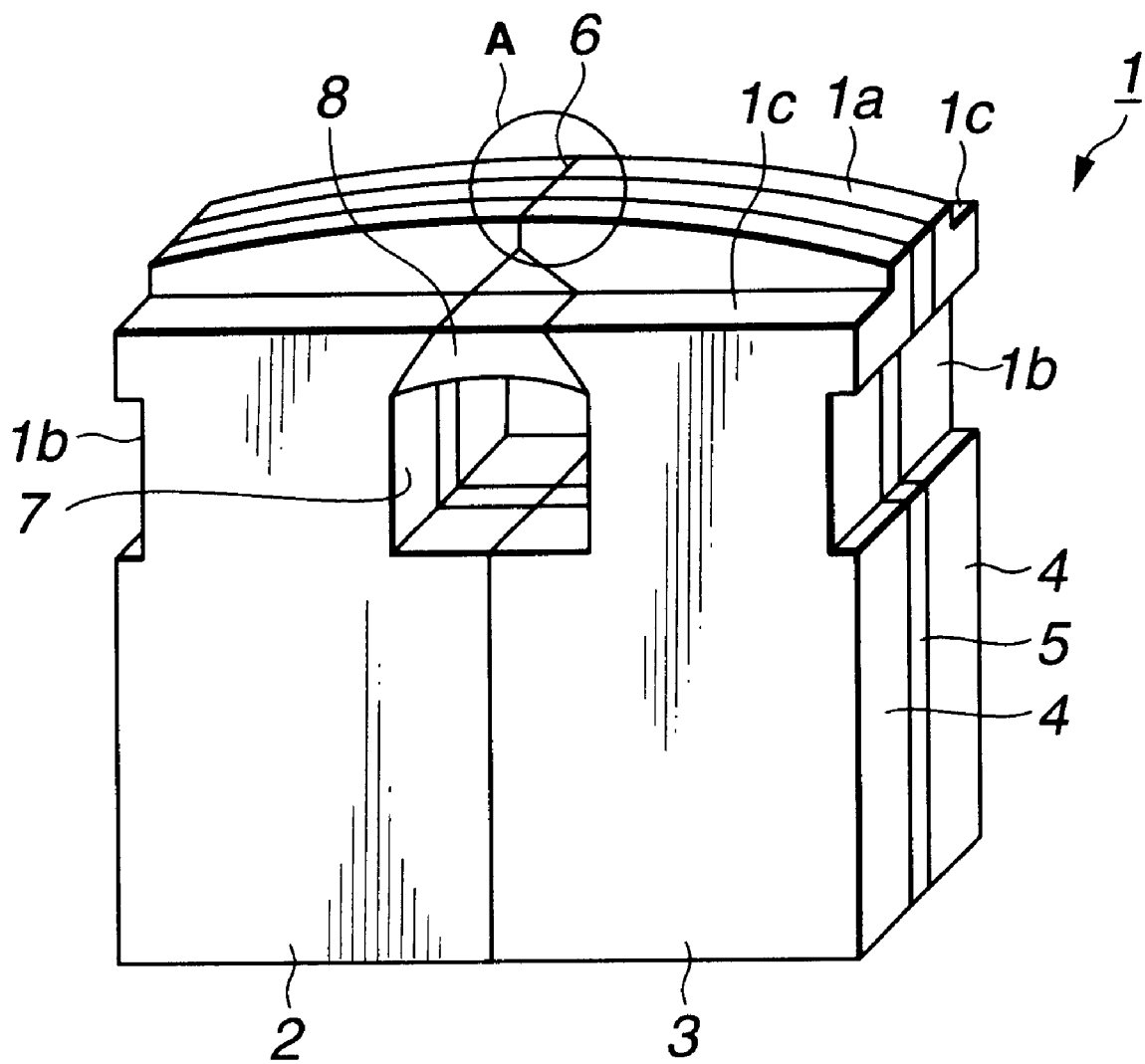
FIG. 1 a schematic perspective view of an embodiment of magnetic head according to the invention that is a multilayer type head.

Now, the present invention will be described in greater detail by referring to the accompanying drawings that illustrate a preferred embodiment of the invention, which is a multilayer type head having a configuration as shown in FIG. 1.

Referring to FIG. 1, the multilayer type head 1 is formed by putting a pair of magnetic core halves 2, 3 together and binding them. The multilayer type head 1 has a medium sliding surface 1a formed at a side thereof, on which a magnetic recording medium is made to slide. The medium sliding surface 1a shows a predetermined radius of carvature. Each of the pair of magnetic core halves 2, 3 is formed by sandwiching a metal magnetic film 5 of the magnetic core between a pair of guard members 4 containing a nonmagnetic material as principal ingredient.

A nonmagnetic film 6 is formed between the abutting surfaces of the paired magnetic core halves 2, 3 to produce a magnetic gap. Then, the paired magnetic core halves 2, 3 are cut: at the abutting surfaces thereof to produce a winding window 7, which is adapted to define the depth of the magnetic gap and receive a coil (not shown). Low melting point glass 8 is filled in the winding window 7 along the side of the medium sliding surface 1a thereof in order to enhance the boding strength of the paired magnetic core halves 2, 3.

Additionally, each of the pair of magnetic core halves 2, 3 is provided at a side thereof located close to the medium sliding surface 1a with a coil groove 1b having a predetermined width and a predetermined depth. The coil grooves 1b, 1b operate to guide the coil that is wound around the multilayer type head 1.

The multilayer type head 1 is additionally provided at the side carrying the medium sliding surface 1a with a pair of contact width limiting grooves 1c, 1c that are running along the medium sliding surface 1a at the opposite lateral sides thereof. Thus, the contact condition of the multilayer type head 1 and the tape-shaped recording medium can be regulated by means of the contact width limiting grooves 1c, 1c.

While the guard members 4 may be made of any appropriate material, preferably, it is made of a ceramic material containing Ca, Ti and Ni as principal ingredients in order to improve the head efficiency and the wear-resistance of the head. More specifically, the guard members 4 are preferably made of a ceramic material containing CaO by 15 to 45 mol %, $TiO_2$ by 40 to 80 mol % and NiO by 5 to 30 mol %. Then, the guard members show a thermal expansion coefficient substantially same as that of the metal magnetic film 5 and are well balanced in terms of wear and partial wear relative to the magnetic recording medium.

Figure 2:
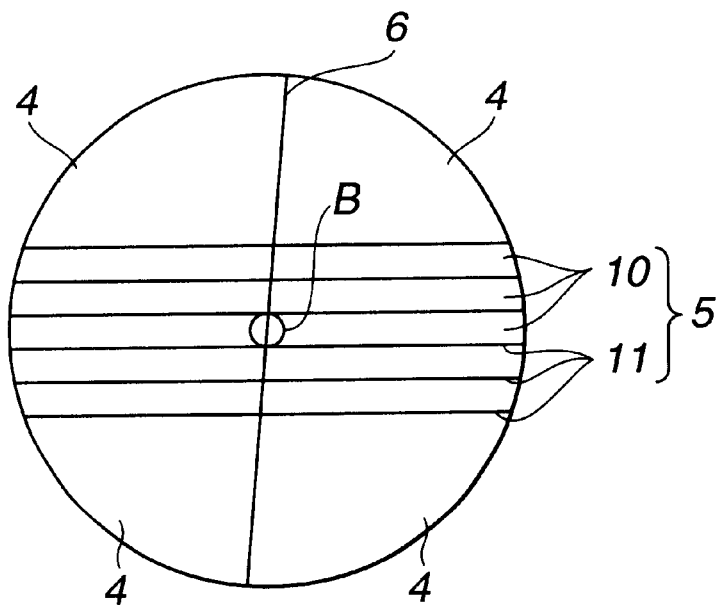
FIG. 2 is an enlarged schematic plan view of the part of the multilayer type head of FIG. 1 encircled and indicated by arrow A in FIG. 1, which is a part of the magnetic gap and its vicinity.

Referring to FIG. 2, the metal magnetic film 5 has a multilayer structure formed by arranging a plurality of metal magnetic layers 10 with an insulating layer 11 arranged between any adjacent metal magnetic layers. A multilayer type head 1 can reduce the eddy-current loss of the metal magnetic film 5, or the magnetic core, thereof to realize a high output level in a high frequency band. Note that FIG. 2 is an enlarged schematic plan view of the part of the multilayer type head of FIG. 1 encircled and indicated by arrow A in FIG. 1, which is a part of the magnetic gap and its vicinity.

Materials that can be used for the metal magnetic layers 10 include crystal materials such as Fe—Al—Si alloy, Fe—Ni—Al—Si alloy, Fe—Ga—Si alloy and Fe—Al—Ge alloy which may or may not contain one or more than one impurities by less than 8 atom %. Impurities that can be used for the purpose of the invention include Co, Ti, Cr, Nb, Mo, Ta, Ru, Au, Pd, N, C and O.

Materials that can be used for the metal magnetic layers 10 also include amorphous materials typically containing Co as principal ingredient to which at least an element selected from Zr, Ta, Ti, Hf, Mo, Nb, Au, Pd and Ru is added and micro-crystal materials containing Co and Fe as principal ingredients to which at least an element selected from Ni, Zr, Ta, Ti, Hf, Mo, Nb, Si, Al, B, Ga, Ge, Cu, Sn, Ru and B and at least an element selected from N, C and O. are added.

While any appropriate electrically insulating material may be used for the insulating layers 11, specific examples of materials that can be used for the insulating layers 11 include oxides and nitrides such as $SiO_2$, $Al_2O_3$ and $Si_3N_4$.

Figure 3:
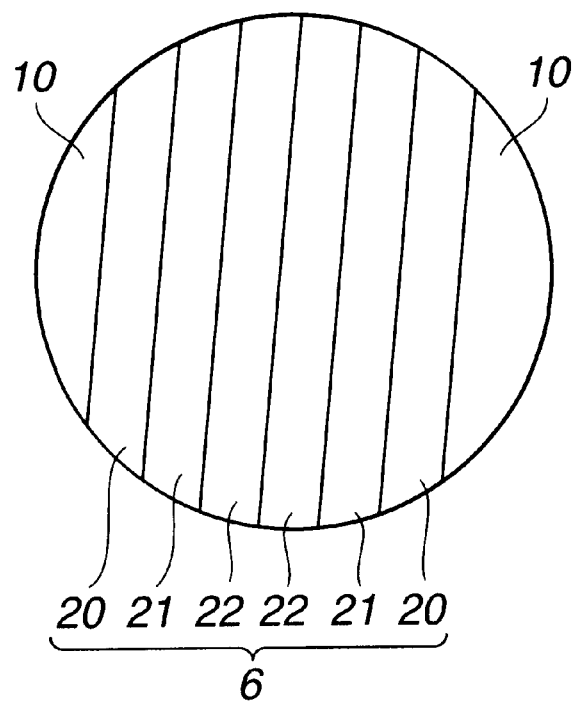
FIG. 3 is an enlarged schematic plan view of the part of the nonmagnetic film of the multilayer type head of FIG. 1 encircled and indicated by arrow B in FIG. 2.

The nonmagnetic film 6 is used to produce a magnetic gap of the magnetic core formed by the metal magnetic film 5. As shown in FIG. 3, the nonmagnetic film 5 has a multilayer structure comprising a first film 20 of an insulating material, a second film 21 of Cr and a third film 22 of Au formed in the above order from the magnetic core half 2 and those formed also in the above order from the magnetic core half 3. Note that FIG. 3 is an enlarged schematic plan view of the part of the nonmagnetic film of the multilayer type head of FIG. 1 encircled and indicated by arrow B in FIG. 2.

Then, the paired magnetic core halves 2, 3 are bonded to each other to form the multilayer type head 1 by diffusion-bonding the third films 22 of the magnetic core halves 2, 3. In reality, the third films 22 formed respectively on the paired magnetic core halves 2, 3 are bonded together to become a single third film. The second films 21 takes the role of maintaining the adhesion of the third film 22 and the first film 20.

When bonding the paired magnetic core halves 2, 3 to form the multilayer type head 1, it may be conceivable to replace the nonmagnetic film 6 with a glass material in order to glass-bond them in place of using the nonmagnetic film 6 for diffusion-bonding. However, if a glass material is used for glass-bonding, the metal magnetic film 5 can be eroded by the glass material to remarkably degrade the magnetic characteristics of the metal magnetic film 5. If, on the other hand, the metal magnetic film 5 is replaced by an amorphous material, the amorphous material may become crystallized to consequently degrade the magnetic characteristics of the film of the amorphous material.

In view of the above problems, a multilayer type head 1 according to the invention comprises a nonmagnetic film 6 for producing a magnetic gap in the magnetic core formed by using the metal magnetic film 5 so that a pair of magnetic core halves 2, 3 may be bonded together by diffusion bonding. As a result, the magnetic characteristics of the metal magnetic film 5 are prevented from being degraded and the pair of magnetic core halves 2, 3 are reliably bonded together.

As pointed out above, the nonmagnetic film 6 of the multilayer type head 1 includes first films 20 of an insulating material formed at the opposite sides thereof and held in contact with the respective magnetic core halves 2, 3. With this arrangement of the multilayer type head 1, the metal magnetic layers 10 of the metal magnetic film 5 are prevented from contacting the respective second films 21 and/or the respective third films 22 to become short-circuited.

Thus, in the multilayer type head 1, the metal magnetic layers 10 of the metal magnetic film 5 remains electrically insulated from each other. Then, the multilayer type head 1 can reduce the eddy-current loss that may arise in the metal magnetic film 5 and improve the head efficiency particularly in a high frequency zone. As a result, the multilayer type head 1 can stably and reliably record magnetic signals on and/or reproduce magnetic signals from a recording medium even if the magnetic signals are made to show a short wavelength and hence adapt itself to a high recording density and a high signal transfer rate.

While any electrically insulating material may be used for the first films 20 of the nonmagnetic film 6, examples of materials that can be used for the first films 20 include oxides such as $SiO_2$, $TiO_2$ and $Al_2O_3$. Particularly, if the guard members 4 are made of a ceramic material containing Ca, Ti and Ni as principal ingredient, it is desirable that the first films 20 are made of $Al_2O_3$. Then, the guard members 4 and the first films 20 show a high adhesion strength to enhance the bonding strength of the paired magnetic core halves 2, 3.

While thickness of the first films 20 are not subjected to any limitation, it is desirable that they have a thickness not less than 5 nm. Then, the first films 20 can reliably establish electric insulation between the second films 21 and the third film 22.

The upper limit of the thickness of the first films 20 is defined in terms of the gap length of the multilayer type head 1. As pointed out above, the multilayer type head 1 comprises a nonmagnetic film 6 to produce a magnetic gap in the magnetic core that is formed by using a metal magnetic film 5. The film thickness of the nonmagnetic film 6 represents the gap length of the magnetic core. In other words, the gap length of the magnetic core of the multilayer type head 1 is reduced to realize a higher recording density relative to a magnetic recording medium by reducing the thickness of the nonmagnetic film 6. Therefore, the upper limit of the film thickness of the first films 20 is defined by the gap length specified for the multilayer type head 1 less the thickness of the second films 21 and the third film 22.

Now, the method of manufacturing a multilayer type head 1 having the above described configuration will be described by referring to the related drawings.

Figure 4:
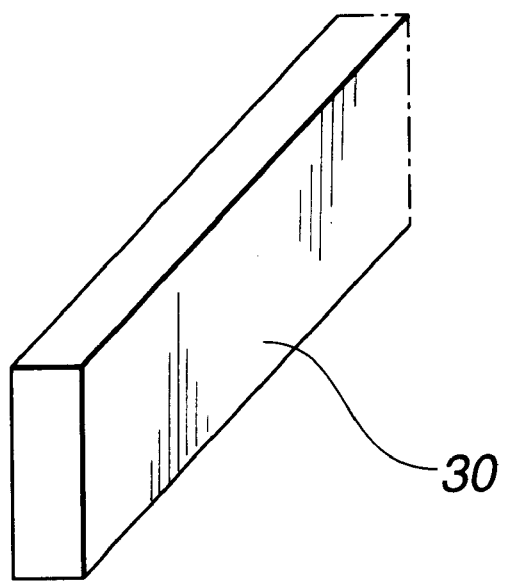
FIG. 4 is a schematic perspective view of a substrate member of the multilayer type head of FIG. 1, illustrating a step of manufacturing the head.

When manufacturing a multilayer type head 1 according to the invention, firstly as shown in FIG. 4, a substrate member 30 made of a nonmagnetic hard material such as AlTiC ($Al_2O_3$—TiC) or a ceramic material is brought in and mirror-polished at the opposite main surfaces. The substrate member 30 eventually make the guard members 4 of the multilayer type head 1.

Figure 5:
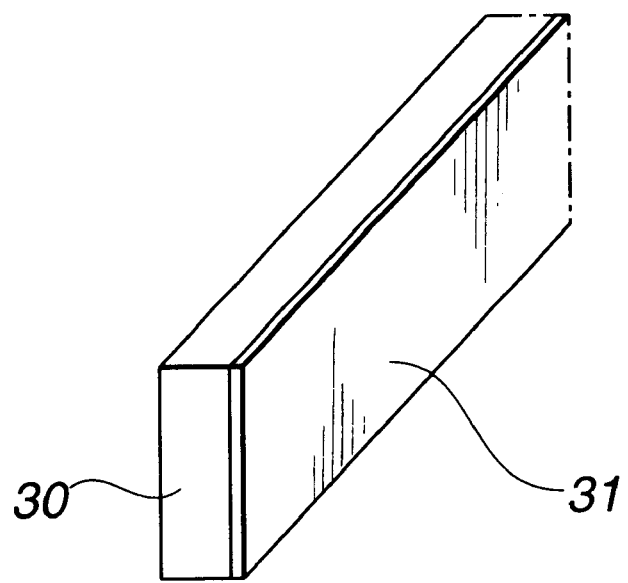
FIG. 5 is a schematic perspective view of the substrate member of FIG. 4 on which a metal magnetic film is formed in a subsequent step of manufacturing the head.

Then, as shown in FIG. 5, a metal magnetic film 31 is formed on one of the main surfaces of the nonmagnetic substrate member 30. The metal magnetic film 31 eventually makes the metal magnetic film 5 of the multilayer type magnetic head 1. More specifically, metal magnetic layers 10 and insulating layers 11 are sequentially formed typically by sputtering, vacuum evaporation or some other thin film forming technique.

Figure 6:
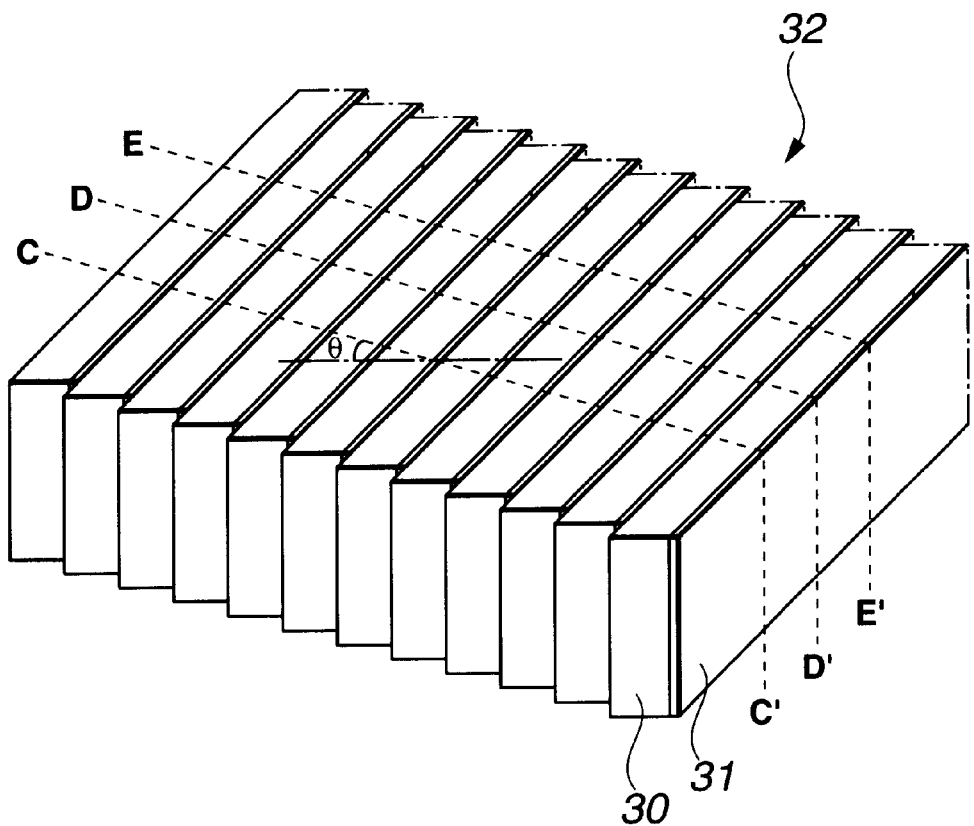
FIG. 6 is a schematic perspective view of a plurality of substrate members of the multilayer type head of FIG. 1 bonded together to form the magnetic core substrate in a further subsequent step of manufacturing the head.

Subsequently, as shown in FIG. 6, a plurality of similar substrate members 30 are bonded together to produce a magnetic core substrate 32. At the time of bonding, each of the substrate members 30 are arranged with the principal surface carrying the metal magnetic film 31 facing upward. In other words, the plurality of substrate members 30 are bonded together to form the magnetic core substrate 32 in such a way that a metal magnetic film 31 is interposed between any two adjacently located substrate members 30.

Figure 7:
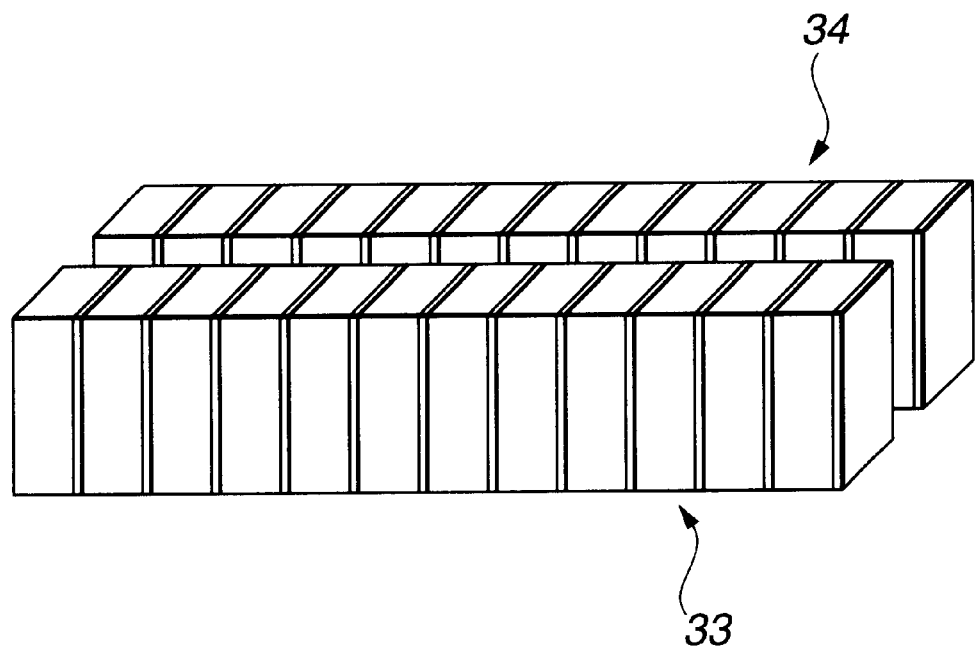
FIG. 7 is a schematic perspective view of the blocks of the magnetic core halves of the multilayer type head of FIG. 1 formed by cutting the magnetic core substrate of FIG. 6 in a further subsequent step of manufacturing the head.

Thereafter, the magnetic core substrate 32 is subjected to a cutting process to produce a pair of blocks of magnetic core halves 33, 34 as shown in FIG. 7. In this process, the magnetic core substrate 32 is typically cut along line C–C', line D–D' and line E–E' in FIG. 6 that are perpendicular to the substrate members 30 so that the produced block may show a predetermined width. Alternatively, each of the substrate members 30 may be cut not perpendicularly but with a predetermined angle θ of inclination. Then, the magnetic gap of the final product of multilayer type head 1 shows an azimuth angle of θ.

Figure 8:
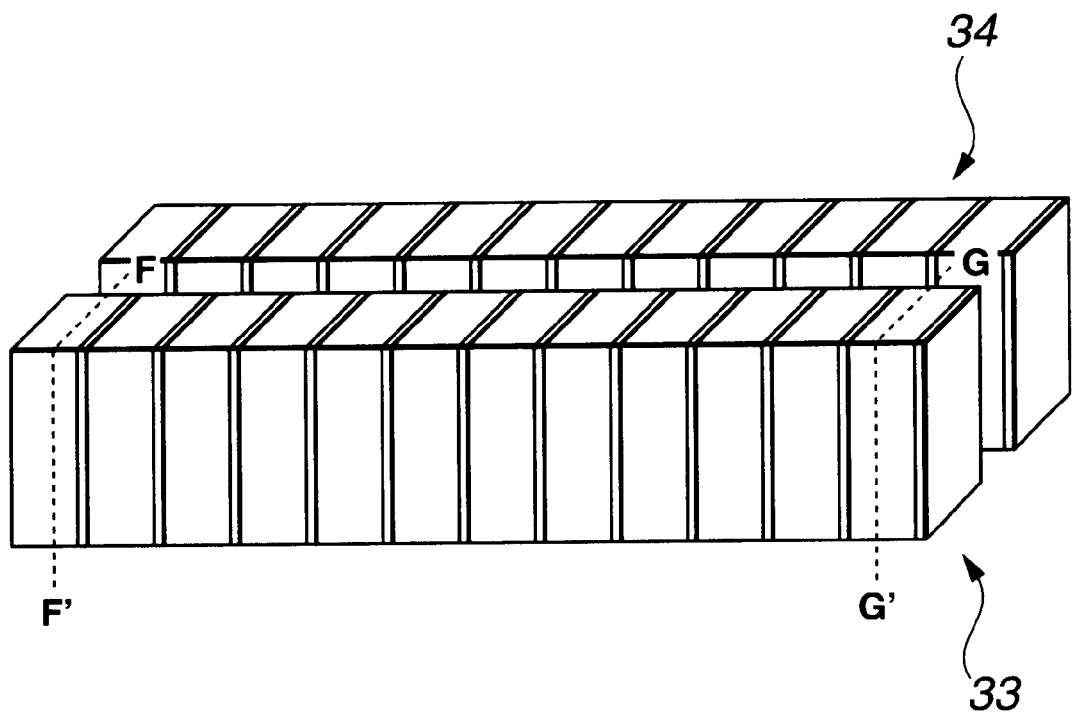
FIG. 8 is a schematic perspective view of the blocks of the pair of magnetic core halves of the multilayer type head of FIG. 1, indicating the plane along which one of the blocks of the paired magnetic core halves is cut in a further subsequent step of manufacturing the head.
Figure 9:
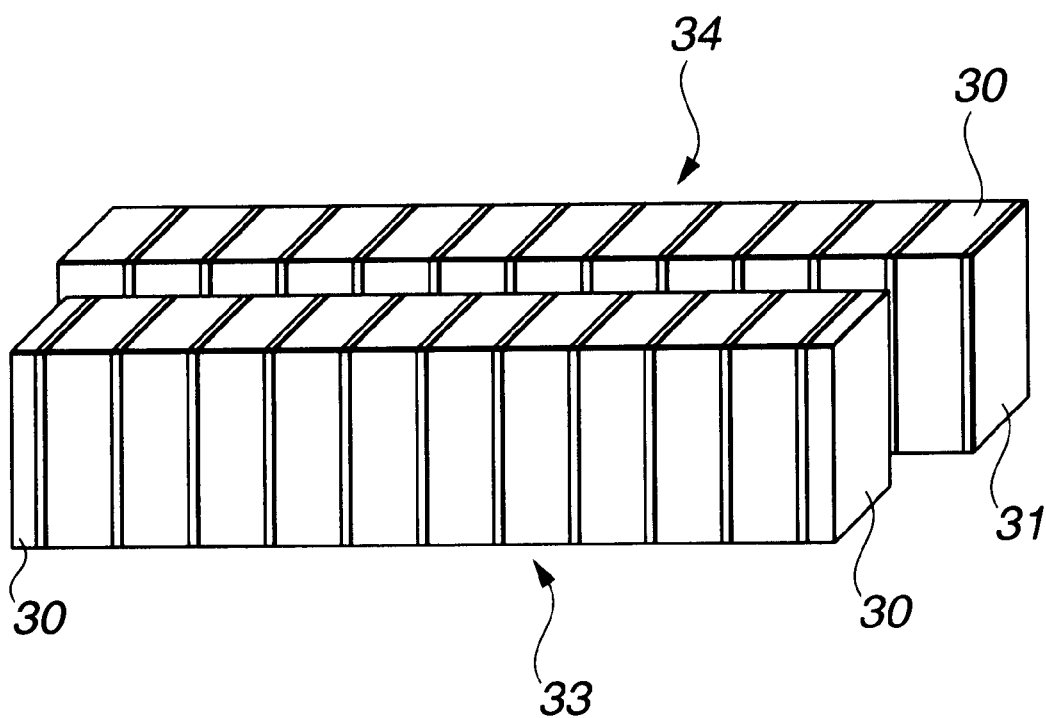
FIG. 9 is a schematic perspective view of the blocks of the pair of magnetic core halves of the multilayer type head of FIG. 1, wherein one of the blocks of the paired magnetic core halves is actually cut.

Then, one of the pair of blocks of the magnetic core halves 33, 34 (e.g., the block of the magnetic core half 33) is cut along line F–F' and line G–G' in FIG. 8 to expose the substrate members 30 at the opposite ends of the block of the magnetic core half 33. As a result, as shown in FIG. 9, the block of the magnetic core half block 33 becomes shorter than the other block of the magnetic core half 34.

Figure 10:
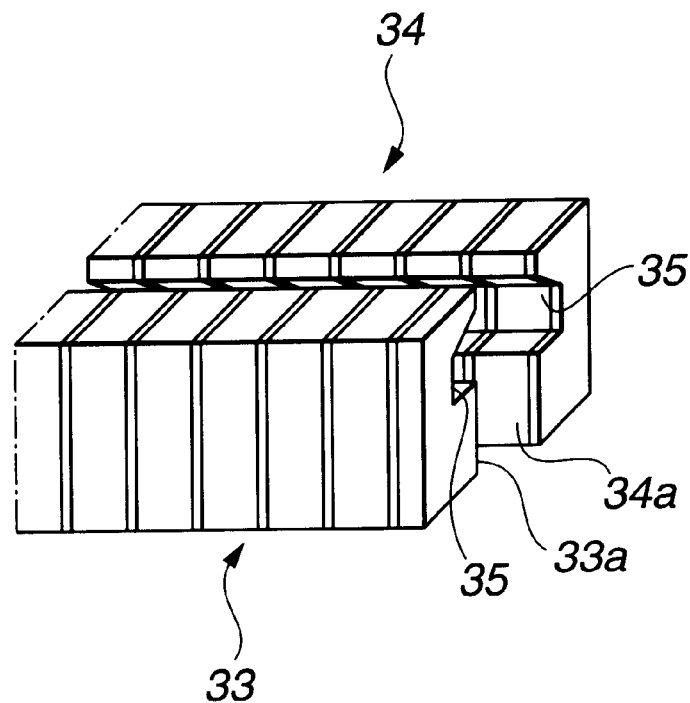
FIG. 10 is a schematic perspective view of the blocks of the pair of magnetic core halves of the multilayer type head of FIG. 1, wherein winding grooves are formed in the blocks of the paired magnetic core halves in a further subsequent step of manufacturing the head.

Thereafter, the pair of blocks of the magnetic core halves 33, 34 are subjected to a grinding operation to produce respective winding grooves 35, 35 running longitudinally along respective lateral sides 33a, 34a thereof as shown in FIG. 10. The winding grooves 35, 35 eventually form a winding window 7 in the finished multilayer type head 1.

Subsequently, the lateral sides 33a, 34a of the pair of blocks of the magnetic core halves 33, 34 where the winding grooves 35, 35 are formed are mirror polished. Then, a nonmagnetic film (not shown in FIG. 10) is formed on each of the lateral sides 33a, 34a. The nonmagnetic films eventually make the nonmagnetic film 6 of the multilayer type magnetic head 1. As pointed out earlier, each of the nonmagnetic films is formed by sequentially laying a first film 20, a second film 21 and a third film 22 by means of a known thin film forming technique such as sputtering or vacuum evaporation.

Figure 11:
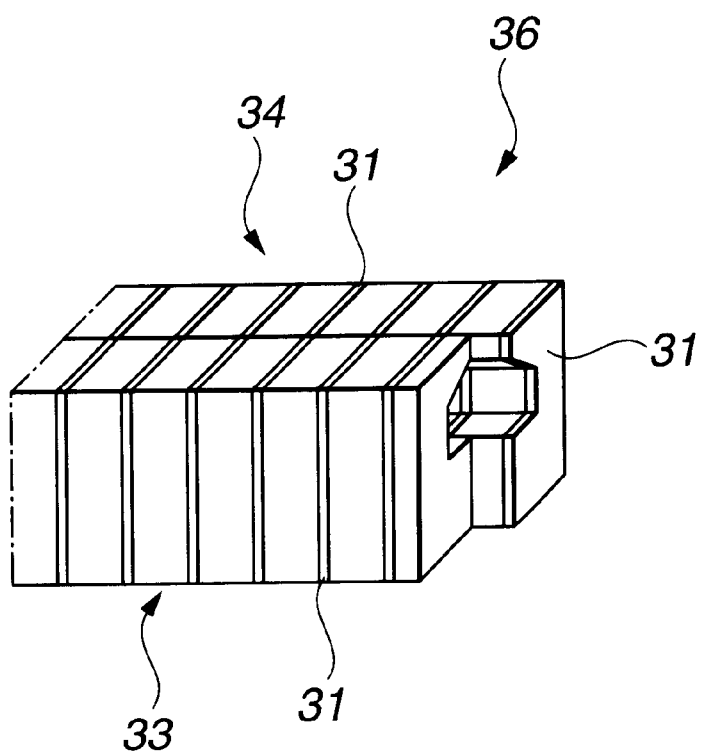
FIG. 11 is a schematic perspective view of the bocks of the pair of magnetic core halves of the multilayer type head of FIG. 1, wherein the blocks of the paired magnetic core halves are bonded together to produce a single magnetic core block in a further subsequent step of manufacturing the head.

Then, the pair of blocks of the magnetic core halves 33, 34 are put together at the lateral sides 33a, 34a thereof in such a way that the corresponding metal magnetic films 31 are aligned in a manner as shown in FIG. 11 and, thereafter, the third films 22 of the two blocks are bonded together by means of low temperature diffusion bonding to produce an integral magnetic core block 36 out of the pair of blocks of the magnetic core halves 33, 34.

Figure 12:
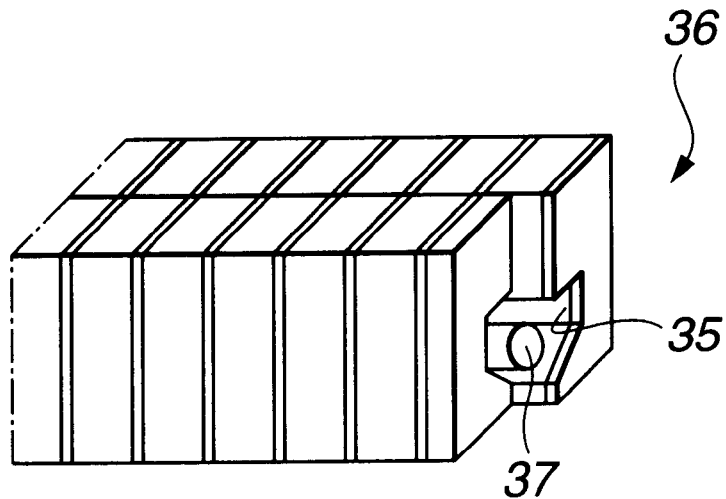
FIG. 12 is a schematic perspective view of the magnetic core block of the multilayer type head of FIG. 1, wherein a glass rod is inserted into the winding grooves of the magnetic core block in a further subsequent step of manufacturing the head.
Figure 13:
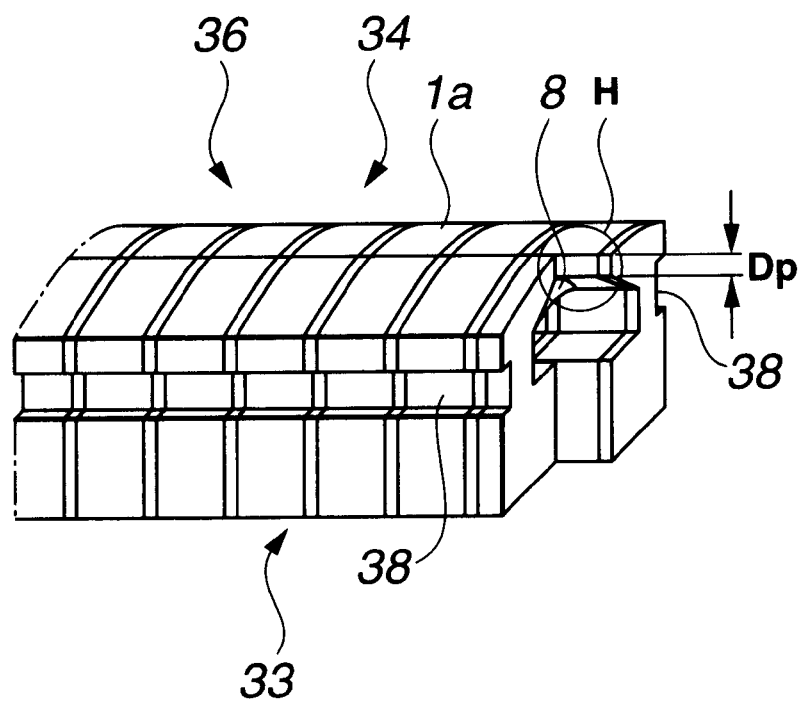
FIG. 13 is a schematic perspective view of the magnetic core block of the multilayer type head of FIG. 1, wherein a recording medium sliding surface is formed on the magnetic core block in a further subsequent step of manufacturing the head.

Subsequently, a glass rod 37 is put into the winding grooves 35, 35 with the side of the magnetic core block 36 that eventually makes the medium sliding surface 1a of the multilayer type head 1 facing downward as shown in FIG. 12. Then, the glass rod 37 is made to melt by heat treatment and subsequently cooled to solidify so that the low melting point glass 8 is filled in the winding grooves 35, 35 along the side of the medium sliding surface 1a of the multilayer type head 1a as shown in FIG. 13.

Then, the magnetic core block 36 is ground to produce a medium sliding surface 1a that is a rounded surface at the side where the low melting point glass 8 is filled. This grinding operation is conducted while observing the end of the longer block of the magnetic core half 34 in order to make the depth Dp of the multilayer type head 1, that is, the portion indicated by arrow H in FIG. 13, as measured from the medium sliding surface 1a to the end of the corresponding winding groove 35 to be equal to a predetermined value.

Furthermore, the magnetic core block 36 is subjected to a grinding operation to produce guide grooves 38, 38 to be used for winding a coil at the opposite lateral sides of the magnetic core block 36 located next to the medium sliding surface 1a. The guide grooves become the coil grooves 1b, 1b of the finished multilayer type head 1.

Figure 14:
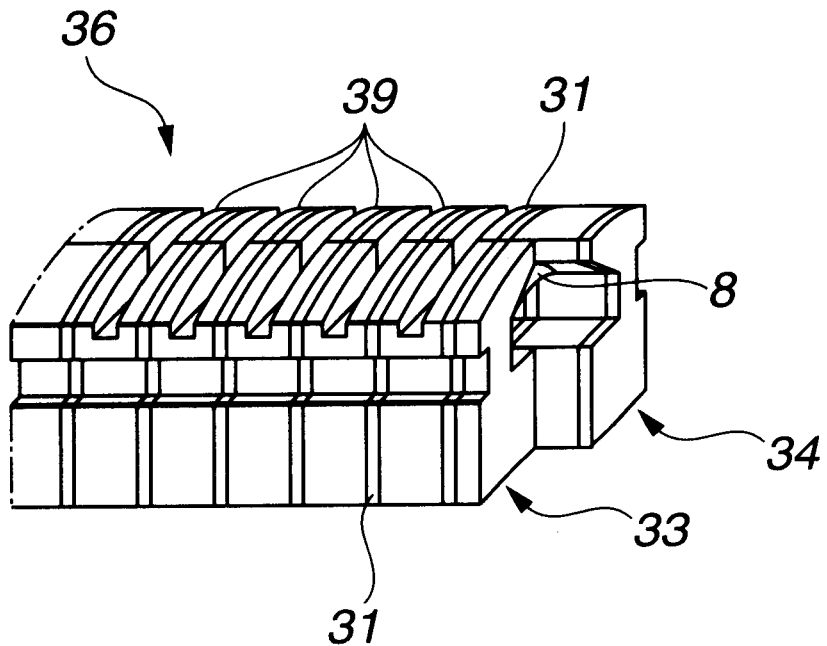
FIG. 14 is a schematic perspective view of the magnetic core block of the multilayer type head of FIG. 1, wherein contact width restricting grooves are formed on the magnetic core block in a further subsequent step of manufacturing the head.

Then, as shown in FIG. 14, a plurality of recesses 39 are formed in the magnetic core block 36 along the metal magnetic films 31 in such a way that the recesses have a predetermined width and are arranged at predetermined intervals. The recesses 39 ultimately become so many contact width limiting grooves 1c of the finished multilayer type head 1.

Figure 15:
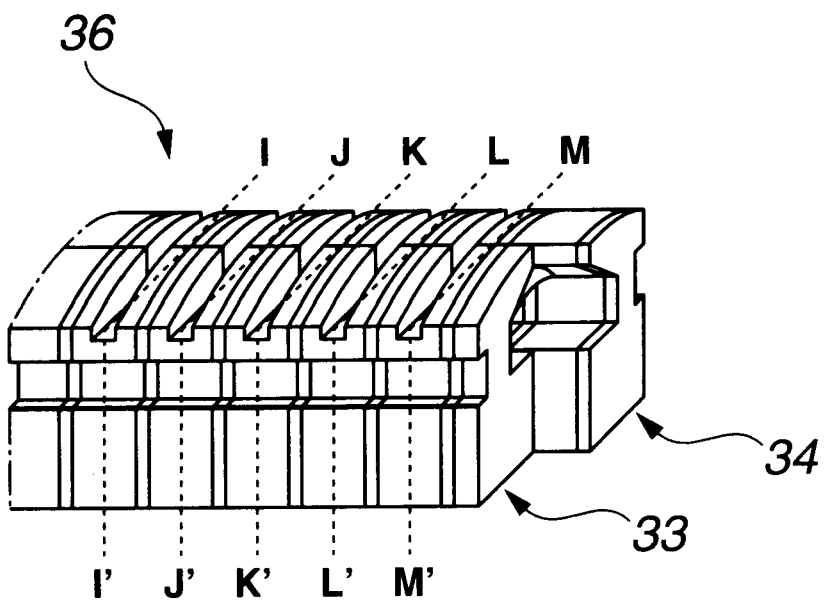
FIG. 15 is a schematic perspective view of the magnetic core block of the multilayer type head of FIG. 1, wherein the magnetic core block is partly cut in a further subsequent step of manufacturing the head.

Thereafter, the magnetic core head 36 is cut from the bottoms of the recesses 39 to divide it into finished multilayer type heads 1. More specifically, it is cult along line I–I', line J–J', line K–K', line L–L' and line M–M' in FIG. 15.

Experiments were conducted on magnetic heads according to the invention and prepared in a manner as described above in terms of multilayer type head 1. The obtained results of the experiments will be discussed below.

1st Experiment: Adhesion Strength of the First Film Relative to the Guard Member Guard members 4 were formed for a multilayer type head 1 by using a ceramic material containing Ca, Ti and Ni as principal ingredient and the adhesion strength of the first film 20 of the nonmagnetic film 6 relative to the guard member 4 was examined.

Figure 16:
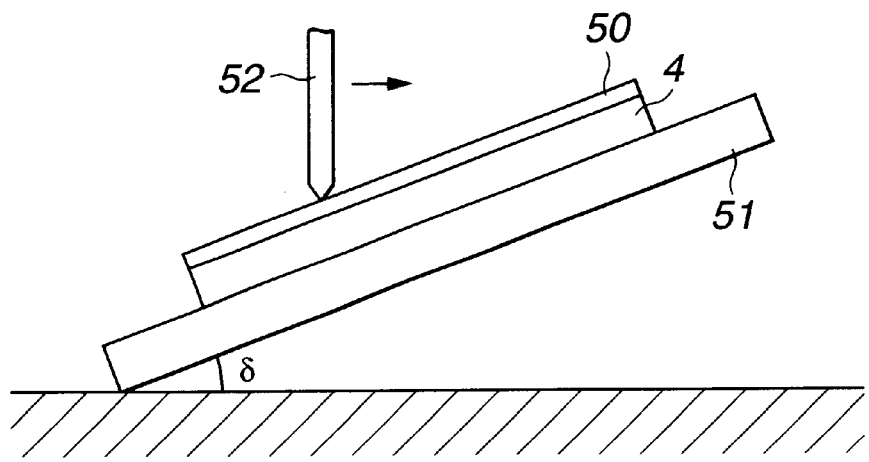
FIG. 16 is a schematic illustration of a method for gauging the adhesion strength of the first film relative to the guard member of a multilayer type head according to the invention.

More specifically, a plurality of flat guard members 4 were prepared and insulating films that correspond to the first film 20 of a multilayer type head 1 were formed on the respective guard members 4 with different compositions. More specifically, insulating films of $SiO_2$, $TiO_2$ and $Al_2O_3$ were formed on the respective guard members 4 to a film thickness of 40 nm by sputtering. Then, as shown in FIG. 16, each of the guard members 4 now carrying an insulating film 50 was mounted on a stage 51 and rigidly secured to the latter and then the stage 51 was tilted by a predetermined angle δ. Then, a needle 52 vertically weighted to a predetermined extent was moved horizontally on the specimen and the force applied to the needle 52 when the insulating film 50 was peeled from the guard member 4 was recorded as the adhesion strength of the insulating film 50 to the guard member 4. The instant when the insulating film 50 was peed from the guard member 4 could be easily recognized because the force applied to the needle 52 was released at that instant.

Figure 17:
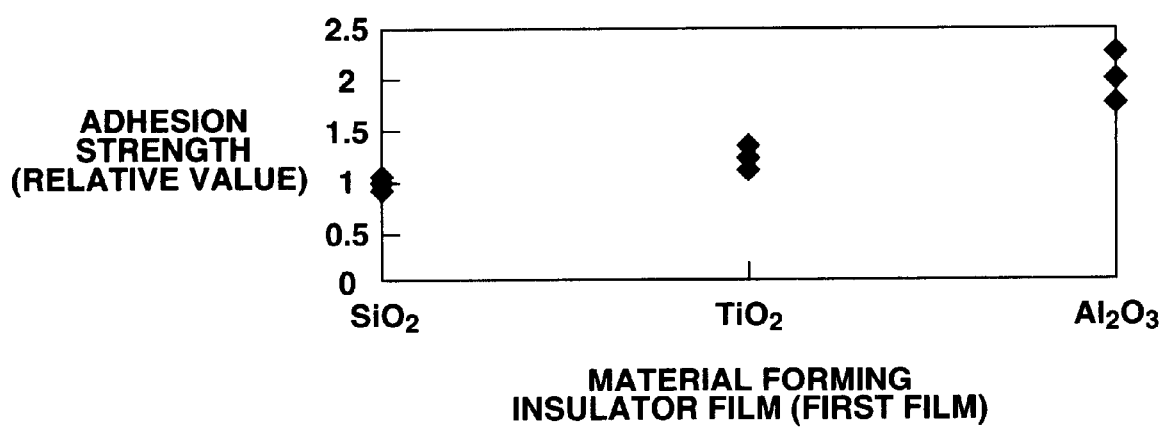
FIG. 17 is a graph illustrating the results obtained in an experiment of gauging the adhesion strength of the first film relative to the guard member of a multilayer type head according to the invention.

FIG. 17 shows the results obtained in the experiment of observing the adhesion strength of the insulating film 50 relative to the guard member 4 made of a ceramic material containing Ca, Ti and Ni as principal ingredient, where different materials were used for the insulating film 50. Note that, in FIG. 17, the adhesion strength of the insulating film 50 that was made of $SiO_2$ is expressed to be equal to 1 and the adhesion strengths of the insulating films 50 that were made of $TiO_2$ and $Al_2O_3$ are expressed in relative values.

As clearly seen from FIG. 17, the adhesion strength of the insulating film 50 made of $Al_2O_3$ is about twice as much as that of the insulating film 50 of $SiO_2$. Therefore, it can be concluded from the first experiment that, when the guard member 4 is made of a ceramic material containing Ca, Ti and Ni as principal ingredients, it is desirable that the first films 20 of the nonmagnetic film 6 are made of $Al_2O_3$. Then, in a multilayer type head 1, the first films 20 will show a high adhesion strength to the respective guard members 4 to improve the bonding strength of the pair of magnetic core halves 2, 3.

2nd Experiment: Bonding Strength of the Paired Magnetic Core Halves

Pairs of magnetic core halves 2, 3 where the first films 20 of the nonmagnetic films 6 were made of different materials were prepared for the multilayer type head 1 and the bonding strength of each of the pairs was observed.

Figure 18:
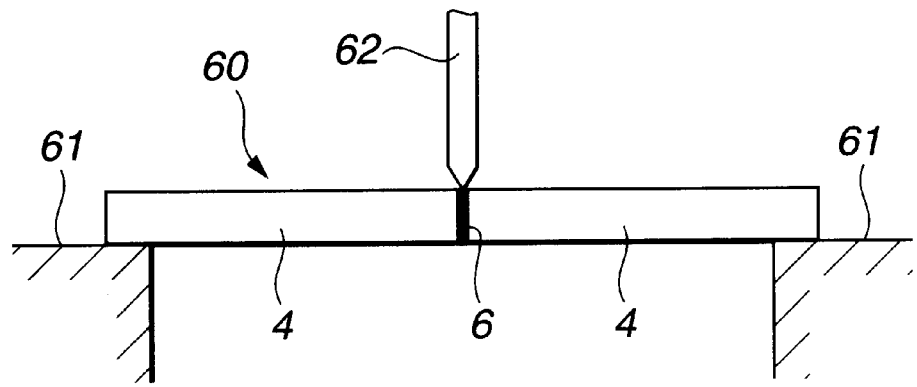
FIG. 18 is a schematic illustration of a method for gauging the bonding strength of the paired magnetic core halves of a multilayer type head according to the invention, using a dummy chip.

Firstly, referring to FIG. 18, a plurality of dummy chips 60, each obtained by bonding a pair of flat guard members 4 via the nonmagnetic film 6, were prepared. In other words, each of the dummy chips 60 corresponds to a multilayer type head 1 that does not have any metal magnetic film 5. The following materials were used for the first films 20 of the nonmagnetic films 6 of the plurality of dummy chips 60.

1st dummy chip: $SiO_2$
2nd dummy chip: $Al_2O_3$
3rd dummy chip: $TiO_2$
4th dummy chip: no first film In each of the dummy chips 60, each of the first films 20, each of the second films 21 and each of the third films 22 of the nonmagnetic film 6 were made of have respective film thicknesses of 40 nm, 20 nm and 20 nm. The second films 21 and the third films 22 were respectively made of Cr and Au. The fourth dummy chip was prepared without any first film 20 and used as control for observing a magnetic head according to the invention. In all the dummy chips, the guard members were made of a ceramic material containing Ca, Ti and Ni as principal ingredients.

Figure 19:
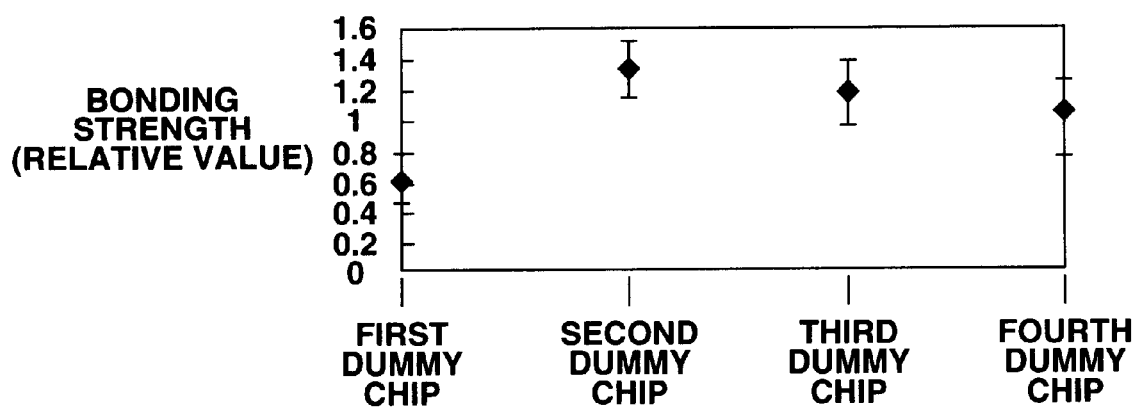
FIG. 19 is a graph illustrating the results obtained in an experiment of gauging the bonding strength of the paired magnetic core halves of a multilayer type head according to the invention, using a dummy chip.

Then, as shown in FIG. 18, each of the prepared dummy chips 60 was made to bridge a pair of stages 61, 61 and a load was applied vertically at the position of the nonmagnetic film 6 by means of a needle 62. The applied load was recorded when the dummy chip 60 was broken as the bonding strength of the pair of magnetic core halves 2, 3. FIG. 19 shows the results obtained in the experiment of observing the bonding strength of each of the dummy chips. Note that, in FIG. 19, the bonding strength of the fourth dummy chip that does not carry any first film 20 is expressed to be equal to 1 and the bonding strengths of the first through third dummy chips are expressed in relative values.

As clearly seen from FIG. 19, the bonding strength of the paired magnetic core halves 2, 3 of the first dummy chip where the first films 20 were made of $SiO_2$ was lower than that of the paired magnetic core halves 2, 3 of the fourth dummy chip that had a configuration same as conventional magnetic heads. On the other hand, the bonding strength of the paired magnetic core halves 2, 3 of the second dummy chip where the first films 20 were made of $Al_2O_3$ was by far higher than that of the paired magnetic core halves 2, 3 of any other dummy chips.

Thus, it is safe to say that, when the guard members 4 are made of a ceramic material containing Ca, Ti and Ni as principal ingredient, it is desirable to form first films 20 from $Al_2O_3$. Then, if the multilayer type head 1 is subjected to external impact, the paired magnetic core halves 2, 3 can be prevented from being broken to a remarkably enhanced extent.

3rd Experiment: Measurement of the Head Output

In this experiment, multilayer type heads 1 were actually prepared and their outputs were observed. More specifically, in this experiment, a magnetic head whose nonmagnetic film 6 does not have any first film 20 was prepared as control and its output was observed.

Figure 20:
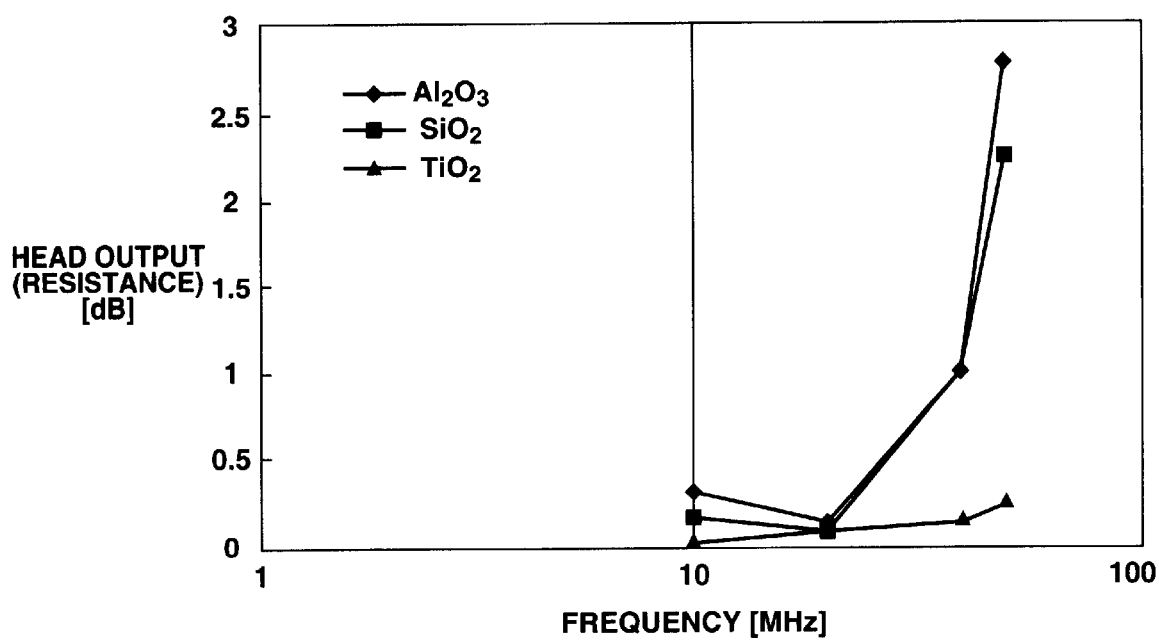
FIG. 20 is a graph illustrating the results obtained in an experiment of gauging the outputs of the multilayer type heads prepared according to the invention.

Then, a plurality of multilayer type heads 1 were prepared by using different materials for the first films 20 of the nonmagnetic films 6. More specifically, $Al_2O_3$, $SiO_2$ and $TiO_2$ were used respectively for the first films 20 of the three different multilayer type heads 1. Then, the head output of each of the multilayer type heads 1 was observed as in the case of the control. FIG. 20 summarily shows the obtained results. Note that, in FIG. 20, the head outputs of the multilayer type heads 1 are expressed in relative terms relative to that of the control magnetic head. More specifically, the head output of each of the multilayer type heads is comparable to that of the control magnetic head at the level of 0 dB.

As clearly seen from FIG. 20, a multilayer type head 1 according to the invention shows a head output level higher than that of the control magnetic head regardless of the material of the first films 20. This is because the first films 20 of the multilayer type head 1 are made of an insulating material to maintain the electric insulation among the metal magnetic layers 10 of the metal magnetic film 5 and reduce the eddy-current loss generated in the metal magnetic film 5.

FIG. 20 also proves that a multilayer type head 1 according to the invention shows an improved head output particularly in a high frequency zone because of the reduction in the eddy-current loss.

What is claimed is:

1. A magnetic head comprising a pair of magnetic core halves, each being formed by sandwiching a metal magnetic film between a pair of guard members containing a nonmagnetic material as principal ingredient, made to abut each other and bonded together at the corresponding end facets of the metal magnetic films and a nonmagnetic film formed along the interface of the metal magnetic films abutting each other in order to produce a magnetic gap;

each of said metal magnetic films having a multilayer structure formed by arranging metal magnetic layers with an insulation layer interposed therebetween;

said nonmagnetic film having a multilayer structure including a first film of an insulating material, a second film of Cr and a third film of Au as arranged from each of said pair of magnetic core halves, said third films being diffusion bonded to each other.

2. A magnetic head according to claim 1, wherein said guard members are made of a ceramic material containing Ca, Ti and Ni as principal ingredients; and said first film is made of $Al_2O_3$.

* * * * *